B. F. WOOD.
Curtain Drying Frame.
No. 218,103. Patented July 29, 1879.
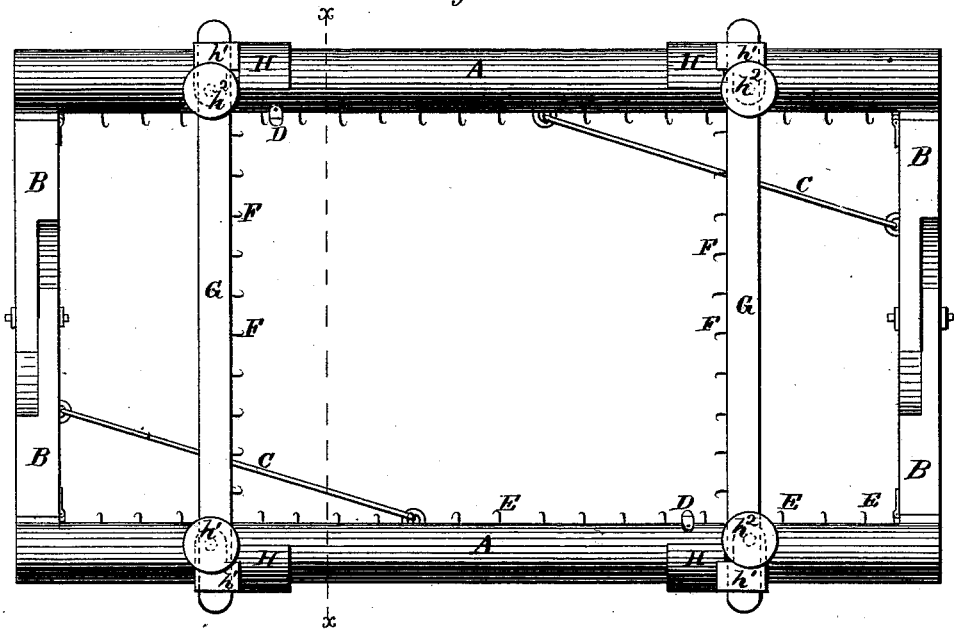
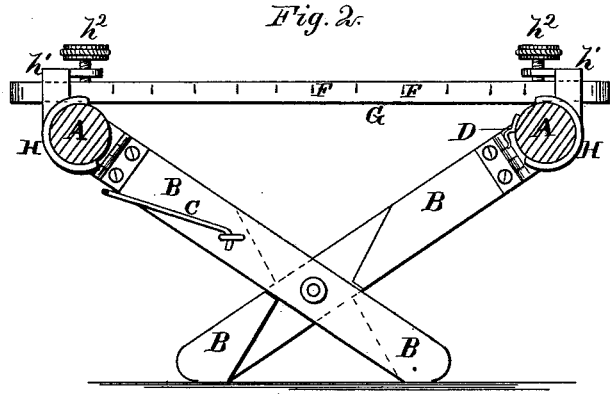
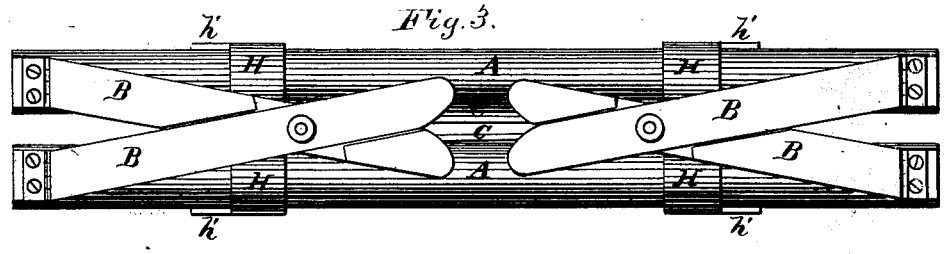
WITNESSES:
INVENTOR:
ATTORNEYS.

UNITED STATES PATENT OFFICE.

BENJAMIN F. WOOD, OF NEW HAVEN, CONNECTICUT.

IMPROVEMENT IN CURTAIN-DRYING FRAMES.

Specification forming part of Letters Patent No. 218,103, dated July 29, 1879; application filed November 20, 1878.

*To all whom it may concern:*

Be it known that I, BENJAMIN FRANKLIN WOOD, of New Haven, in the county of New Haven and State of Connecticut, have invented a new and Improved Adjustable Frame for Drying Lace Curtains, of which the following is a specification.

Figure 1 is a top view of my improved frame arranged for use. Fig. 2 is a vertical cross-section of the same, taken through the line $x$ $x$, Fig. 1. Fig. 3 is a view of the same folded.

Similar letters of reference indicate corresponding parts.

The object of this invention is to furnish an improved frame for drying lace curtains under tension which shall be simple in construction, convenient in use, and reliable in operation, holding the curtains under a uniform tension while drying.

A are the side bars of my improved frame, to the under side of the ends of which are hinged the upper ends of the legs B. The lower parts of the legs B are halved and pivoted to each other, as shown in Figs. 1, 2, and 3, to enable the frame to be adjusted with the side bars, A, at any desired distance apart, according to the width of the curtains to be dried. The hinged legs B are kept in place, when the frame is extended, by the long hooks C, which are hinged to the side bars, A, and hooked into staples attached to the said legs B.

When not in use the hooks C are held in place along the under side of the side bars, A, by spring-catches D, so as to lie wholly out of the way.

Along the inner sides of the side bars, A, are a series of hooks, E, upon which the side edges of the curtains to be dried are hooked. The end edges of said curtains are hooked upon hooks F, attached to the inner edges of the cross-bars G, which rest upon the upper sides of the side bars, A, beneath the shoulders $h^1$, formed upon the slides H, where they are secured in place by the set-screws $h^2$, as shown in Figs. 1 and 2.

The slides H are fitted upon the side bars, A, so that they may be slid longitudinally upon said side bars to adjust them to the length of the curtain to be dried, and are made open upon their inner sides to allow them to pass the hooks E.

The slides H rock or turn upon the side bars, A, so that the shoulders $h^1$ may always be directly over the top of the said side bars, A, whatever their distance apart may be.

When not required for use, the cross-bars G are placed upon the upper sides of the side bars, A, and longitudinally therewith, where they are secured in place by the set-screws $h^2$ and arms $h^1$ of the slide H.

With this construction curtains of any desired size may be securely held under a uniform tension while drying, so that it will not be necessary to send curtains to a factory to be done up.

With this construction, also, the frame, when not required for use, can be folded into compact form for storage or transportation.

Having thus fully described my invention, I claim as new and desire to secure by Letters Patent—

1. A curtain-drying frame consisting of longitudinal bars A A, cross-pivoted legs B, hinged hooks C, spring-catches D, and end bars, G G, attached to adjustable slides H, the bars A G being provided with hooks on the inside, as shown and described, whereby the bars A automatically adjust themselves to the width of curtain, while the bars G slide to the requisite point to adapt them to the length, and are there secured.

2. The bars A, connected by hinged legs B, whose lower parts are crossed, halved, and pivoted to each other, substantially as and for the purpose set forth.

BENJAMIN FRANKLIN WOOD.

Witnesses:
E. LYMAN,
E. C. MORTON.